Patented July 26, 1938

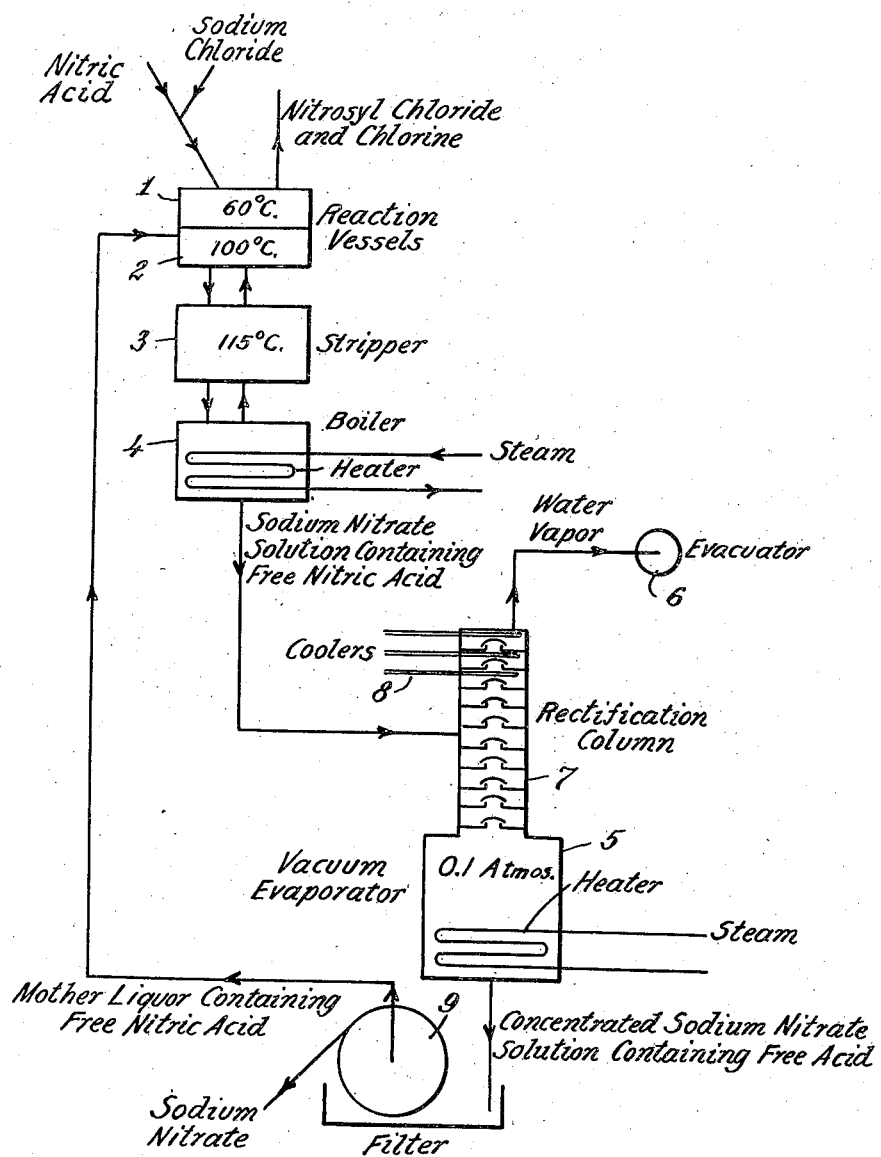

2,124,536

UNITED STATES PATENT OFFICE 2,124,536

RECOVERY OF ALKALI METAL NITRATES

Herman A. Beekhuis, Jr., Petersburg, Va., assignor, by mesne assignments, to The Solvay Process Company, New York, N. Y., a corporation of New York Application August 12, 1933, Serial No. 684,830

2 Claims. (Cl. 23—102)

This invention relates to a process for the recovery of an alkali metal nitrate from solutions containing the same, together with nitric acid. More particularly the invention relates to the production of an alkali metal nitrate by reaction of nitric acid and an alkali metal chloride to form a solution of the alkali metal nitrate containing free nitric acid and to the recovery from such a solution of crystalline sodium nitrate.

It is known that nitric acid and an alkali metal chloride will react to form an alkali metal nitrate in accordance with one or the other of the following reactions, using sodium chloride as an example of the alkali metal chloride.

I. $NaCl + HNO_3 = NaNO_3 + HCl$
II. $3NaCl + 4HNO_3 = 3NaNO_3 + NOCl + Cl_2 + 2H_2O$

In the practical carrying out of these reactions for the production of alkali metal nitrate, the alkali metal chloride and nitric acid do not completely react so that the resulting solution of sodium nitrate containing more or less hydrochloric acid also contains free nitric acid and may also contain some undecomposed sodium chloride.

It is an object of this invention to provide a process for the recovery of sodium nitrate from solutions containing free acid, particularly the solution containing nitric acid obtained in reacting alkali metal chloride with nitric acid.

In carrying out the process of this invention a solution containing alkali metal nitrate and nitric acid is subjected to a pressure below atmospheric and under such a pressure is heated to vaporize water from the solution. As the solution becomes concentrated, sodium nitrate is crystallized out, and by employing the relatively lower temperatures required for evaporation of water from the solution under the reduced pressure the nitric acid tends to remain in the solution. In employing this method for recovering alkali metal nitrate from solution in conjunction with the process for the production of the alkali metal nitrate from alkali metal chloride and nitric acid, the crystalline sodium nitrate may be separated from the mother liquor and the latter returned to the process for forming sodium nitrate whereby the nitric acid and alkali metal chloride in the mother liquor may be utilized for the production of additional alkali metal nitrate.

A preferred process for forming and recovering alkali metal nitrate in accordance with this invention comprises treating a reaction mixture containing nitric acid and alkali metal chloride to obtain a solution of sodium nitrate containing free nitric acid in amount not greater than that which corresponds to about a 7-normal solution of the acid. This solution is then evaporated under a reduced pressure of, for example, about $\frac{1}{10}$th of an atmosphere to crystallize sodium nitrate from the solution while retaining the free nitric acid in the solution. When the acidity of the mother liquor amounts to about 25% or more $HNO_3$, preferably about 25% to 50% $HNO_3$, the sodium nitrate is separated from the mother liquor and the mother liquor is mixed with the reaction mixture to be treated for the production of additional sodium nitrate in the manner described above.

The following example is illustrative of the process of this invention, but the invention is not limited to the details set forth in this example:

The accompanying drawing illustrates diagrammatically an apparatus in which the process of this example may be carried out.

About 250 parts of 50% nitric acid are mixed with about 70 parts of solid sodium chloride to form a slurry and this reaction mixture is passed consecutively through two reaction vessels 1 and 2, a stripper 3 and a boiler 4. In the boiler the liquor therein is heated to boil it and the steam evolved, which contains low concentrations of nitrosyl chloride and chlorine and more or less nitric acid and hydrochloric acid, is passed in series first through the stripper and then through the reaction vessels in the reverse order to that in which the reaction mixture advances through the apparatus. The material in the reaction vessel 1 is maintained at about 60° C. and the reaction vessel 2 and stripper 3 at 100 C. and 115 C. respectively, by means of the heat transferred thereto from the boiler. The sodium chloride and nitric acid introduced into such a system react to form sodium nitrate, nitrosyl chloride and chlorine. The rate of supplying aditional nitric acid and sodium nitrate and of heating the reaction mixture in the several stages is regulated so that the solution in the boiler contains an amount of nitric acid corresponding to not greater than about a 7-normal acid solution. For example, the solution may have the following approximate composition:

25 parts $HNO_3$
124½ parts $NaNO_3$
4 parts $NaCl$
161½ parts $H_2O$

Solution of the above approximate composition is withdrawn from the boiler and introduced into a vacuum evaporator 5 constructed of an acid resistant alloy such as, for example, a chrome-iron alloy containing 18% chromium or more, and preferably one containing about 28% chromium. A pressure of about 1/10th of an atmosphere is maintained in the vacuum evaporator by an evacuator 6 and the solution is evaporated under this reduced pressure at a temperature of about 60° C. to crystallize out sodium nitrate. The temperature at which the solution evaporates is characteristic of the concentration of dissolved materials in the solution and the reduced pressure maintained in the evaporator. Operating under a pressure of about 1/10th of an atmosphere and discountinuing the evaporation while the solution contains about 50% or less $HNO_3$, the concentration of nitrate is limited to that forming a saturated solution in the aqueous nitric acid present. Under these conditions the temperature at which the solution evaporates and the composition of the solution is always such that there is but a small amount of free nitric or hydrochloric acid in the vapors withdrawn from the evaporator and even this amount of acid in the vapors may be substantially completely eliminated by their rectification. For example, the vapors may be passed into the bottom of a rectification column 7 into the middle portion of which solution on the way to the evaporator is introduced and the solution passed downwardly in the column in contact with the ascending vapors. In the upper portion of the column the vapors may be cooled by coolers 8 to condense a portion of the vapors and this condensate passed downwardly in contact with the ascending vapors to absorb acid from the vapors and return it to the solution in the evaporator. Instead of cooling the vapors in the upper portion of the rectification column, vapors leaving the top of the column may be condensed and a portion of the relatively cool condensate may be introduced into the top of the column and passed downwardly in contact with the rising vapors to absorb the small amount of acid in the vapors.

As the solution in the evaporator is concentrated, sodium nitrate crystallizes out. The solid sodium nitrate may be separated from the acid mother liquor in an acid resistant centrifuge or filter 9. When the acidity of the mother liquor reaches 25 to 50% nitric acid, the mother liquor is returned to one of the reaction vessels or to the stripper and mixed with the reaction mixture being heated therein at a temperature at which the nitric acid and sodium chloride react to form sodium nitrate. By thus operating, the nitric acid and any sodium chloride in the mother liquor may be further utilized for the production of sodium nitrate. In a continuously operated process, with nitric acid and sodium chloride being continuously supplied at the desired rate to the reaction vessels, and an acid solution of sodium nitrate being continuously supplied to the vacuum evaporator, the solution in the evaporator may be maintained at a substantially constant acidity within the preferred range of 25 to 50% nitric acid by continuously withdrawing concentrated solution containing crystallized sodium nitrate from the evaporator at a desired rate and after separation of the crystallized sodium nitrate, returning the mother liquor to the reaction vessels or stripper. Under the conditions of operation described for this example, the concentration of alkali metal in the solution remains within the range of 1% (in the solution drawn from boiler 4) to 8% (in the solution concentrated in evaporator 5 until the nitric acid concentration rises to 50% $HNO_3$). Throughout the time the solution is in contact with the chrome-iron alloy of which the evaporator is constructed, the concentration of nitric acid in the solution is substantially greater than the chloride concentration.

Numerous changes and modifications may be made in the process of the foregoing example without departing from the scope of this invention. Thus, while the invention has been particularly described in connection with the production of sodium nitrate from sodium chloride and nitric acid, and recovery from solution of the sodium nitrate, it is applicable to the production and recovery of alkali metal nitrates, as for example, potassium nitrate from potassium chloride and nitric acid.

While the crystallization of nitrate from solution would ordinarily be accomplished within the evaporator, it is possible to concentrate the solution in the evaporator and then separately cool the concentrated liquor to crystallize the nitrate. After separation of the crystallized nitrate the mother liquor could be returned to the evaporator for further concentration.

I claim:

1. The cyclic process for the production of an alkali metal nitrate which comprises heating a reaction mixture containing nitric acid, an alkali metal chloride and a mother liquor from a previous cycle to form a solution of alkali metal nitrate containing free nitric acid heating said solution under a pressure of about 0.1 atmosphere to evaporate the solution at a temperature at which water vapor is evolved from the solution while the free acid in the solution is retained therein, continuing said evaporation until a substantial quantity of alkali metal nitrate has been crystallized and the acidity of the mother liquor amounts to about 25% or more $HNO_3$, and introducing resulting mother liquor into a reaction mixture containing nitric acid and alkali metal chloride to form the aforesaid reaction mixture.

2. The process for the production of an alkali metal nitrate which comprises heating a reaction mixture containing nitric acid and an alkali metal chloride to form a solution of alkali metal nitrate containing free nitric acid, heating said solution under a pressure below atmospheric at a temperature at which water vapor is evolved from the solution while the free acid is retained therein to evaporate said solution and to crystallize said nitrate therefrom and passing the vapors evolved from the solution in direct contact with fresh portions of said solution containing alkali metal nitrate and free nitric acid which are to be evaporated in the manner described and then in contact with a condensate obtained by cooling the vapors, to rectify the vapors by absorption and condensation of nitric acid in the solution and condensate.

HERMAN A. BEEKHUIS, Jr.